United States Patent [19]

Sosin

[11] 4,138,819
[45] Feb. 13, 1979

[54] OUTSIDE CORNER SQUARE

[76] Inventor: Gershon J. Sosin, 5 Latimer St., Bloomfield, Conn. 06002

[21] Appl. No.: 863,149

[22] Filed: Dec. 22, 1977

[51] Int. Cl.² .............................................. B43L 7/00
[52] U.S. Cl. .................................................. 33/113
[58] Field of Search ...................... 33/75, 85, 112, 113, 33/95, 96, 180 R, 174 R, 174 N, 174 H

[56] References Cited

U.S. PATENT DOCUMENTS

| 1,066,926 | 7/1913 | Lee | 33/85 |
| 1,826,807 | 10/1931 | McDanel | 33/174 R |
| 2,906,031 | 9/1959 | Rice | 33/382 |
| 3,245,201 | 4/1960 | Richardson | 33/180 R |
| 3,276,128 | 10/1966 | Ponich | 33/180 R |
| 3,276,133 | 10/1960 | Nowjak | 33/174 S |
| 3,760,272 | 8/1956 | Van Cantie | 33/180 R |

Primary Examiner—Harry N. Haroian
Attorney, Agent, or Firm—McCormick, Paulding & Huber

[57] ABSTRACT

An improved square for use on outside corners formed by approximately right angularly arranged first and second surfaces and an outwardly projecting obstruction at the corner. The square comprises first and second right angularly arranged arms each with a precise inwardly facing linear edge surface. Each of the arms terminates a substantial distance from an imaginary inside corner residing at the intersection of first and second lines projected respectively from said inwardly facing linear edge surfaces on the first and second arms. An interconnecting means between the first and second arms takes a generally particircular form with opposite ends thereof connected respectively with the arms and with an intermediate portion extending arcuately outwardly and defining a clearance opening in the general shape of a segment of a circle. The distances between the inner or proximate ends of the arms and the imaginary corner are equal and the arms are provided with indicia of measurement which may be in the English, Metric or other systems of measurement.

7 Claims, 7 Drawing Figures

OUTSIDE CORNER SQUARE

BACKGROUND OF THE INVENTION

There are many instances where an obstruction at an outside corner between approximately right angularly arranged surfaces renders the use of a conventional square difficult if not impossible of achievement. The inside corner defined by intersecting inner edges of the arms of the square creates an interference condition with the obstruction at the corner of the right angularly arranged corner surfaces and the angular arrangement of the corner surfaces cannot be precisely determined due to the inability to bring the inner surfaces of the arms of the square into engagement therewith. The conventional square may be positioned in spaced relationship with the corner surfaces and measurements taken to the surfaces in an attempt to ascertain their angular relationship but this is unwieldy and subject to inaccuracies.

It is the general object of the present invention to provide an improved square for use on outside corners having outwardly projecting obstructions at the corners, said square having first and second right angularly arranged arms and an arm interconnecting means which provides a clearance opening for receiving the corner obstruction.

A further object of the invention resides in the provision of an improved square of the type mentioned wherein indicia of measurement are provided along the arms of the square and referenced to an imaginary inside corner whereby accurate measurements may be taken along perpendicular corner surfaces despite the presence of an obstruction at the corner.

SUMMARY OF THE INVENTION

In fulfillment of the foregoing objects, an improved square is provided with first and second angularly arranged arms each having a precise inwardly facing linear edge surface for engagement with first and second approximately right angularly arranged corner surfaces, the corner being characterized by an outwardly projecting obstruction at or near the corner. Each arm terminates a substantial distance from an imaginary inside corner which resides at the intersection of first and second lines of projection extending respectively from the inwardly facing linear edge surfaces of the arms. An arm interconnecting means extends between the ends of the arms which are proximate the imaginary inside corner and maintains the arms in their precise right angular relationship. The said means also defines a clearance opening extending outwardly of the imaginary corner for receiving the outwardly projecting obstruction at the corner of the first and second corner surfaces and for thus enabling the linear inner arm edge surfaces to engage and to determine the precise angular relationship of the corner surfaces.

Indicia of measurement along the arms of the square are referenced to the imaginary corner lying on the lines of projection from the inner edges of the arms and may be used to determine with accuracy distances along each arm from the imaginary corner. Desired or necessary points of location along the first and second corner surfaces may thus be established with accuracy and with a high degree of ease and convenience.

DESCRIPTION OF PREFERRED EMBODIMENTS

Figure 1:
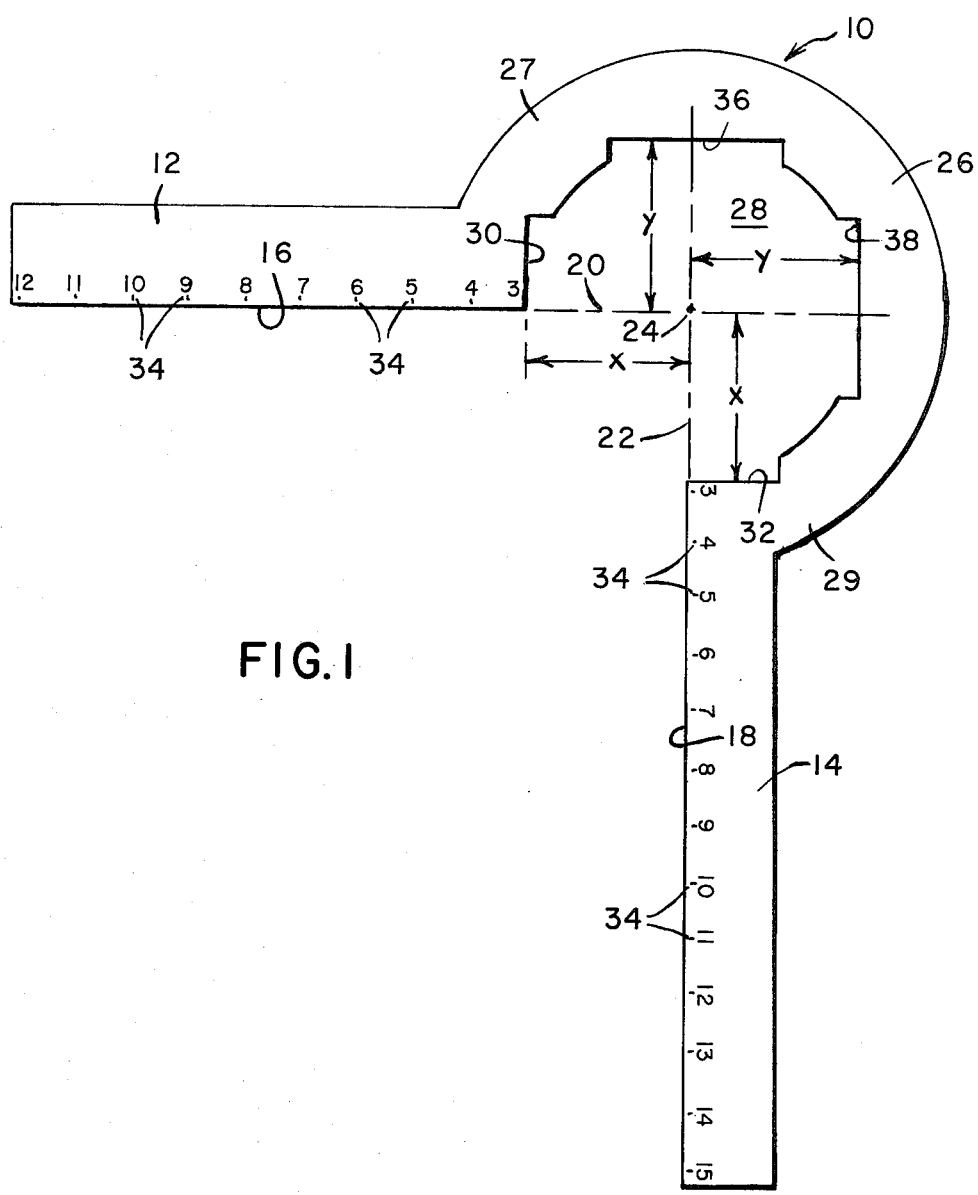
FIG. 1 is a plan view of the improved square of the present invention.

Referring particularly to FIG. 1, an improved square indicated generally at 10 27 forms a presently preferred embodiment of the present invention. The square 10 comprises first and second right angularly arranged arms 12, 14 each having a precise inwardly facing linear edge surface for engagement with first and second approximately right angularly arranged corner surfaces. The arm 12 is shown with an inwardly facing linear edge surface 16 and the arm 14 with a similar edge surface 18. Each of the arms 12 and 14 terminates a substantial distance from an imaginary inside corner which resides at the inner section of first and second lines of projection extending respectively from the inwardly facing linear edge surfaces 16, 18. A first line of projection 20 is shown extending from the edge surface 16 and a second line of projection 22 extends similarly from the edge surface 18 on the arm 14. The imaginary inside corner which resides at the intersection of the lines of projection 20, 22 is indicated at 24. The arms 12 and 14 may be of equal length but are shown with the arm 14 somewhat longer than the arm 12.

A means interconnecting the first and second arms 12 and 14 may vary widely in the contemplation of the invention. As shown, an interconnecting means 26 takes the form of a particircular member which has opposite ends 27, 29 thereof connected and formed integrally with the proximate ends of the arms 12, 14. The interconnecting means 26 may also obviously be formed separately from the arms 12 and 14 and connected thereto by appropriate means and such construction falls within the scope of the invention.

An intermediate portion of the interconnecting means or member 26 extends arcuately outwardly from its opposite end portions 27, 29 and defines a clearance opening 28 which may take the general shape of a segment of a circle as shown. In any event, the clearance opening 28 extends outwardly from the imaginary inside corner 24 and with the proximate ends of the arms 12, 14 spaced apart and spaced from the corner 24 as shown, clearance is thus provided for an outwardly projecting obstruction at or near an outside corner to be measured. The size and shape of the clearance opening 28 are of course judiciously selected to provide the required clearance for a variety of obstructions to be encountered in use of the square.

Preferably and as illustrated, each of the arms 12, 14 of the improved square has an inner end or edge surface proximate the imaginary inside corner 24 which is arranged at right angles with respect to its linear inner edge. Thus, the arm 12 is shown with an end edge 30 perpendicular to the edge 16 and the arm 14 has a similar end edge 32 perpendicular to its inner edge 18. Spacing of the edges 30, 32 from the imaginary corner 24 is preferably equal as shown, the dimension being illustrated at x. In the square illustrated the distance x equals 3 inches and indicia of measurement are provided along the arms of the square referenced to the imaginary corner 24. Thus, the edges 30, 32 are indicated as being three inches distant from the imaginary corner 24 and inch marks proceed outwardly along the arms as indicated at 34, 34. While the English system of measurement is illustrated, it will of course be apparent that indicia of measurement along the arms 12, 14 may also take the form of the Metric system of measurement.

Still referring to FIG. 1, it will be observed that the interconnecting member 26 is provided with a pair of right angularly arranged flat edge surfaces indicated generally at 36, 38. The flat edge surface 36 is arranged opposite the imaginary corner 24 and in parallel and facing relationship with the edge 32 on the arm 14. Similarly, the flat surface or edge 38 is arranged opposite the imaginary corner 24 but facing and parallel with the end edge 30 on the arm 12. Spacing of the edges 36, 38 from the imaginary corner 24 are preferably equal as illustrated at y,y and the dimensions y,y are also equal to the spacing of the end edges 30, 32 from the imaginary corner. Thus, the dimensions y,y are equal and also equal to the dimensions x,x. As will be apparent, measurements may be taken from the edges 36, 38 to locate points on an obstruction at the outside corner to be measured.

Figure 2:
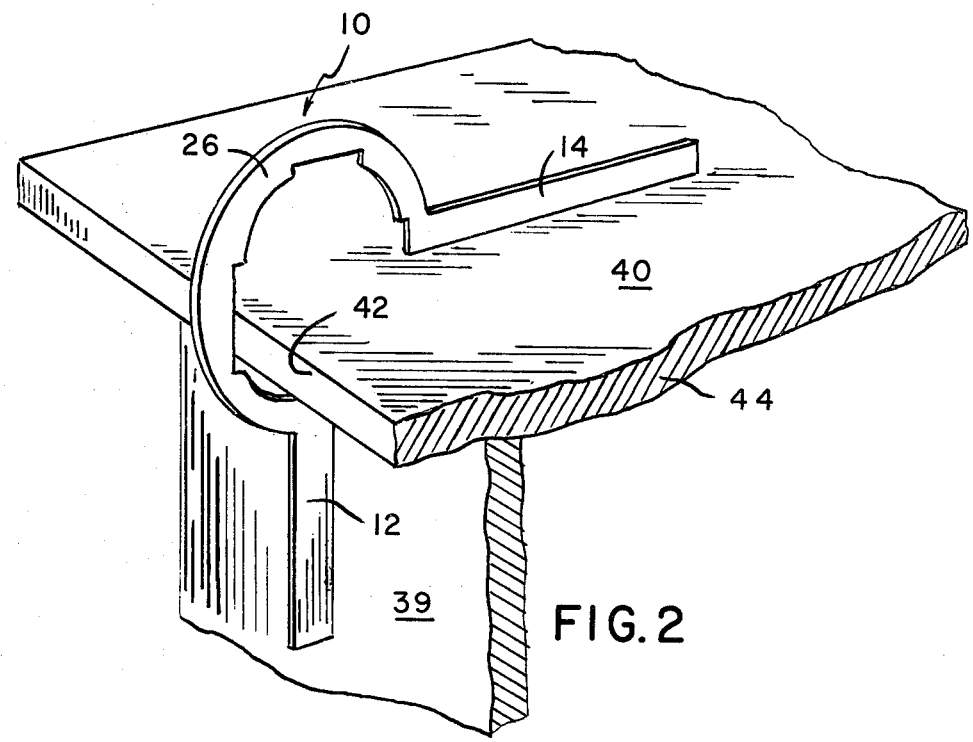
FIG. 2 is a perspective view illustrating the square in use on a table-like construction having a projection at an outside corner.
Figure 3:
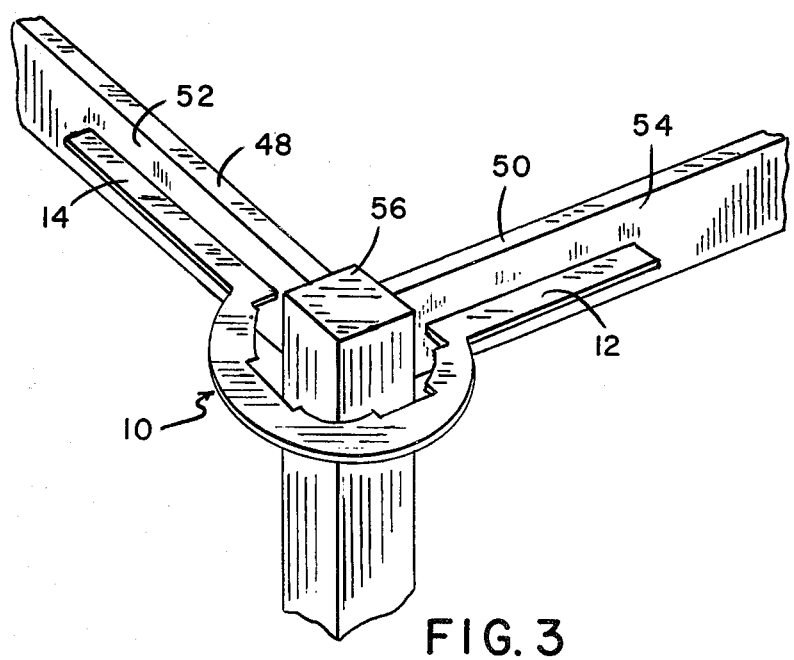
FIG. 3 is a further perspective view illustrating the square in use on a frame-like construction having a projection at the outside corner.
Figure 4:
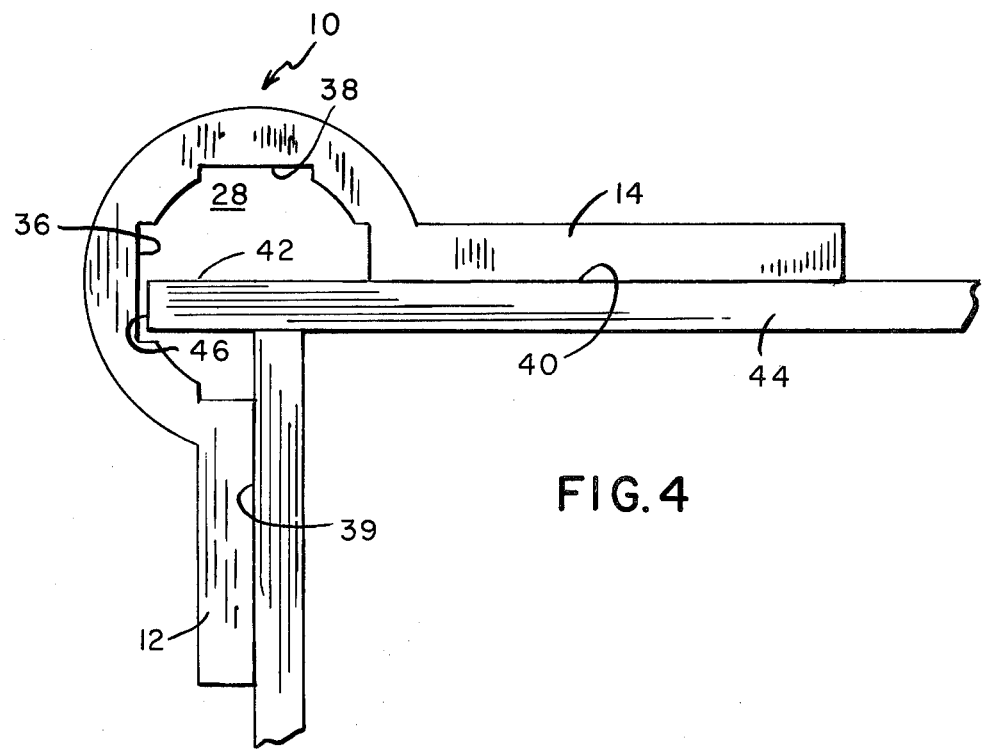
FIG. 4 is a side elevational view similar to FIG. 2.

Referring now particularly to FIGS. 2 and 4, the mode of use of the square will be better understood. In these figures the improved square 10 is shown in use on an outside corner comprising approximately right angularly arranged surfaces 39, 40 and which has an obstruction projecting outwardly at the corner. The obstruction comprises a continuation 42 of the upper member 44 which defines the surface 40 and which may comprise a table top or the like. As best illustrated in FIG. 4, the square 10 can be positioned to accurately measure and determine the angular relationship of the surfaces 39, 40. The obstruction 42 projects within the clearance area 28 of the square defined by the interconnecting member 26 and does not interfere with such measurement or perpendicular alignment. Further, the indicia of measurement along the arms 12, 14 of the square, not shown in FIGS. 2–4, may be employed to purposes. points along the surfaces 39, 40 and for other purpose. Still further, the flat surfaces 36, 38 may be employed to locate the end surface 46 and other points on the projection 42 relative to other dimensions in the table construction.

Figure 5:
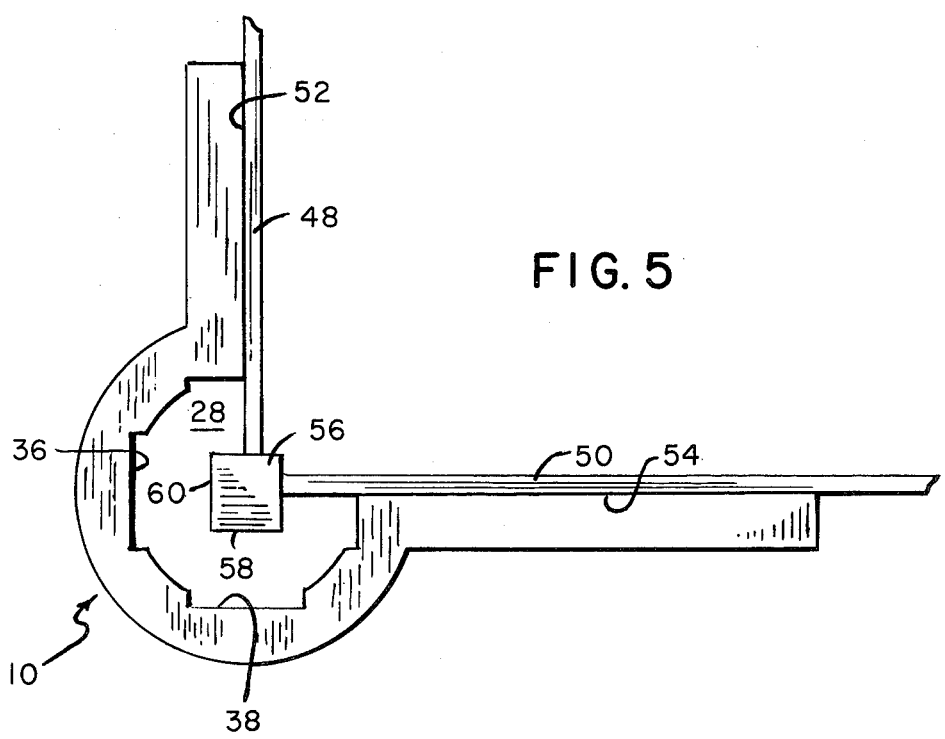
FIG. 5 is a plan view similar to FIG. 3.

In FIGS. 3 and 5 the improved square 10 is shown in use with a frame-like construction having first and second right angularly arranged members 48, 50 defining corner surfaces 52, 54 and a corner frame member 56 projects into the clearance area 28, FIG. 5. As will be apparent, the square may be employed as above to determine the angular relationship of the surfaces 52, 54 and to locate points therealong employing indicia on the arms of the square. Further, the member 56 has surfaces 58, 60 which may be located respectively with the use of the flat surfaces 36, 38.

Figure 6:
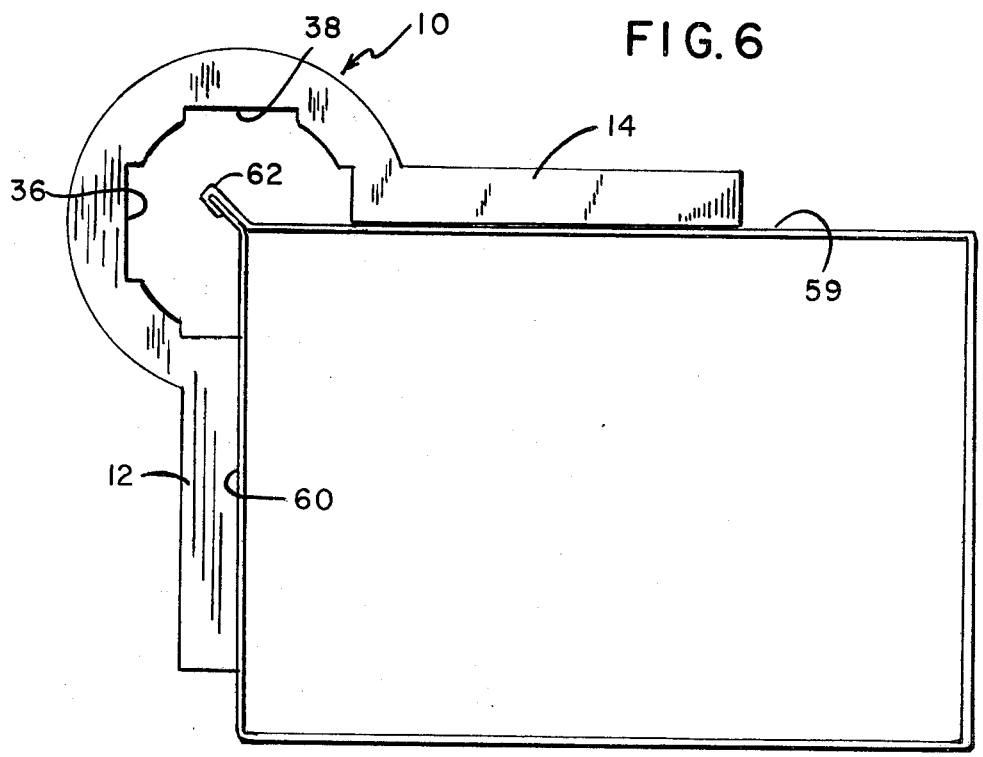
FIG. 6 is a side elevational view showing the square in use with a formed metal box-like construction having a projection at an outside corner.

Referring particularly to FIG. 6, the improved square 10 of the invention is shown in use with a formed metal box-like construction having first and second right angularly arranged surfaces 59, 61 and an outwardly projecting obstruction 62 at the corner. The use of the square will be apparent in determining perpendicularity of the surfaces 59, 61 and in locating the obstruction 62 from the flat surfaces 36, 38.

Figure 7:
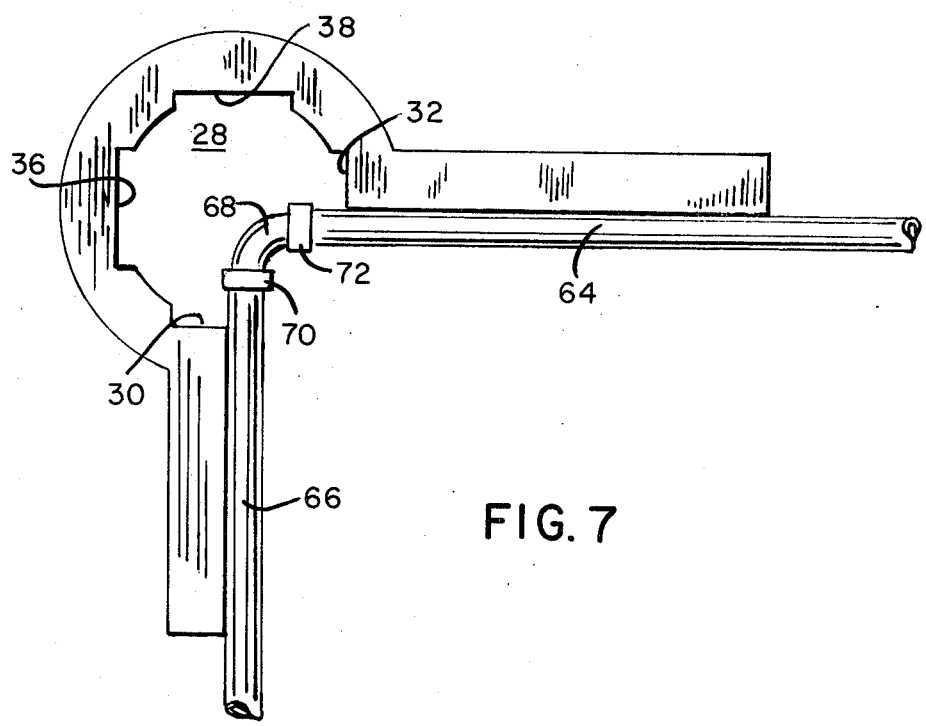
FIG. 7 is a side elevation view showing the square in use with a pipe assembly having a pair of flanges forming obstructions adjacent an outside corner.

In FIG. 7 right angularly arranged pipes 64, 66 have an elbow 68 and flanged coupling members 70, 72 which form an obstruction adjacent the corner. The use of the square in squaring the pipes 64, 66 will be apparent and the use of the flat surfaces 36, 38 and/or arm end surfaces 30, 32 in locating the flanges 70, 72 will also be apparent.

From the foregoing it will be apparent than an improved square has been provided for accommodating obstructions at or adjacent the corners of approximately perpendicular surfaces and for determining the relative angles of such surfaces and establishing points of measurement therealong. The square is also capable of use in locating points on the obstructions and it will be apparent that further provision may be made for locating such obstructions as by incorporating angular or degree indicia along the interconnecting member 26 of the square.

I claim:

1. A square adapted for use on outside corners formed by approximately right angularly arranged first and second surfaces and an outwardly projecting obstruction at the corner, said square comprising first and second right angularly arranged arms each having a precise inwardly facing linear edge surface for engagement with said first and second surfaces, each of said arms terminating a substantial distance from an imaginary inside corner residing at the intersection of first and second lines projected respectively from said inwardly facing linear edge surfaces on said arms, and means interconnecting said first and second arms at their ends proximate said imaginary inside corner and maintaining said arms in said right angular relationship, said interconnecting means taking a generally particircular form with opposite ends thereof connected respectively with said proximate ends of said arms and with an intermediate portion thereof extending arcuately outwardly from said opposite ends and defining a clearance opening in the general shape of a segment for receiving said outwardly projecting obstruction at the corner of said first and second corner surfaces and thus enabling said linear arm inner edge surfaces to engage said corner surfaces, and said arms being provided with indicia of measurement serially spaced therealong from their said ends proximate said imaginary corner and referenced to said imaginary corner.

2. A square for use on outside corners as set forth in claim 1 wherein said interconnecting means is formed integrally with said arms.

3. A square for use on outside corners as set forth in claim 1 wherein the distances between said imaginary corner and said ends of said arms is equal.

4. A square for use on outside corners as set forth in claim 1 wherein an inner surface of said interconnecting means is provided with a pair of flat surfaces respectively facing the proximate ends of said arms but on opposite sides of said imaginary corner from said proximate ends, the distances between said imaginary corner and said ends of said arms and between said imaginary corner and said flat surfaces all being equal.

5. A square for use on outside corners as set forth in claim 1 wherein said indicia of measurement are expressed in the English system of measurement.

6. A square for use on outside corners as set forth in claim 1 wherein each of said arms has an end surface proximate said imaginary corner which extends at right angles from its said linear inner surface.

7. A square for use on outside corners as set forth in claim 1 wherein said indicia of measurement are expressed in the Metric system of measurement.

* * * * *